United States Patent
Zhang et al.

(10) Patent No.: US 12,174,997 B2
(45) Date of Patent: Dec. 24, 2024

(54) DATA OBFUSCATION

(71) Applicant: BLUE PRISM LIMITED, Warrington (GB)

(72) Inventors: De Zhang, Warrington (GB); Krishna Sandeep Reddy Dubba, Warrington (GB)

(73) Assignee: BLUE PRISM LIMITED, Warrington (GB)

( * ) Notice: Subject to any disclaimer, the term of this patent is extended or adjusted under 35 U.S.C. 154(b) by 223 days.

(21) Appl. No.: 17/882,312

(22) Filed: Aug. 5, 2022

(65) Prior Publication Data

US 2023/0040974 A1 Feb. 9, 2023

(30) Foreign Application Priority Data

Aug. 5, 2021 (EP) ..................................... 21189837

(51) Int. Cl.
*G06F 21/62* (2013.01)

(52) U.S. Cl.
CPC ...... *G06F 21/6245* (2013.01); *G06F 21/6227* (2013.01)

(58) Field of Classification Search
CPC ............. G06F 21/6245; G06F 21/6227; G06F 21/602; G06F 21/6254; H04L 2209/42
See application file for complete search history.

(56) References Cited

U.S. PATENT DOCUMENTS

| | | | |
|---|---|---|---|
| 8,925,099 B1 * | 12/2014 | Saxe | G06F 21/6245 |
| | | | 713/187 |
| 10,354,090 B2 * | 7/2019 | Lacey | G06F 21/6245 |
| 10,469,572 B2 | 11/2019 | Moss et al. | |
| 11,093,632 B1 * | 8/2021 | Ton-That | G06N 20/00 |

(Continued)

FOREIGN PATENT DOCUMENTS

| | | | | |
|---|---|---|---|---|
| EP | 3798906 A1 * | 3/2021 | ......... | G06F 21/6254 |
| GB | 2531713 A | 5/2016 | | |

(Continued)

OTHER PUBLICATIONS

Tesfay et al, "PrivacyBot: Detecting Privacy Sensitive Information in Unstructured Text", 2019 Sixth International Conference on Social Media Networks Analysis, Management and Security (SNAMS), p. 53-60 (Year: 2019).*

(Continued)

*Primary Examiner* — Christopher A Revak
(74) *Attorney, Agent, or Firm* — BAKERHOSTETLER (57) ABSTRACT

The present invention relates to a computer-implemented method for obscuring sensitive data. The method comprises: acquiring, by a processor, image data; extracting, by the processor, structured data from the image data, the structured data being sensitive data and having a defined functional format and a defined visual format; generating, by the processor, artificial data that is different from the structured data, the artificial data having the same functional format as the structured data; generating, by the processor, artificial image data based on the image data in which the structured (Continued)

data is replaced with the artificial data, the artificial data being based on the visual format of the structured data; and outputting, by the processor, the artificial image data.

16 Claims, 7 Drawing Sheets

(56) References Cited

U.S. PATENT DOCUMENTS

| | | | | |
|---|---|---|---|---|
| 11,120,199 | B1* | 9/2021 | Bachtiger | G06F 40/284 |
| 11,557,136 | B1* | 1/2023 | Zimmermann | G06V 20/63 |
| 2015/0012919 | A1 | 1/2015 | Moss et al. | |
| 2018/0285591 | A1 | 10/2018 | Thayer et al. | |
| 2019/0236310 | A1* | 8/2019 | Austin | G16H 10/60 |
| 2020/0267283 | A1 | 8/2020 | Tong | |
| 2021/0216336 | A1 | 7/2021 | Dubba et al. | |
| 2021/0271586 | A1* | 9/2021 | Emek | G06F 11/3664 |
| 2022/0164474 | A1* | 5/2022 | Netke | G06F 21/6254 |
| 2022/0405274 | A1* | 12/2022 | Shang | G06F 16/2455 |
| 2023/0128136 | A1* | 4/2023 | Sahu | G06F 16/41 |
| | | | | 726/26 |

FOREIGN PATENT DOCUMENTS

| | | | | |
|---|---|---|---|---|
| WO | WO 2020/082187 A1 | 4/2020 | | |
| WO | WO 2020/093165 A1 | 5/2020 | | |
| WO | WO-2021111289 A1 * | 6/2021 | | G06F 21/6254 |
| WO | WO-2022261244 A1 * | 12/2022 | | |

OTHER PUBLICATIONS

Ning et al, "Deep Learning based Privacy Information Identification approach for Unstructured Text" Journal of Physics: Conference Series, p. 1-10 (Year: 2021).*

International Patent Application No. PCT/EP2022/071384; Int'l Search Report and the Written Opinion; dated Oct. 31, 2022; 14 pages.

European Patent Application No. 21189837.4; Extended Search Report; dated Jan. 24, 2022; 10 pages.

"Roberta-base"; https://huggingface.co/roberta-base; Hugging Face; accessed Dec. 2, 2022; 9 pages.

* cited by examiner

START acquiring image data _510_ extracting structured data from the image data, the structured data being sensitive data having a defined functional format and a defined visual format _520_ generating artificial data that is different from the structured data, the artificial data having the same functional format as the structured data _530_ generating artificial image data based on the image data in which the structured data is replaced with the artificial data, the artificial data based on the visual format of the structured data _540_ outputting the artificial image data _550_

END

| Entity Type 625 | Structured Data 615 | Artificial Data 660 |
|---|---|---|
| DATE_TIME | 1.5 hrs | 1.22 hrs |
| DATE_TIME | Mon 22/02/2021 10:28 | Fri 24/06/1987 19:03 |
| DOMAIN_NAME | www.blueprism.com | Baker-stewart.com |
| EMAIL_ADDRESS | Ben.Carter@blueprism.com | williamstonya@powell.net |
| PERSON | Ben Benjamin Carter | Christopher Farrell |
| PERSON | Ben Carter | Anne Wells |
| PERSON | De Zhang | Ian White |
| PERSON | Eric Tyree | Lisa Mason |
| PERSON | John Reid | Dale Cook |
| PERSON | Krishna Dubba | Michele Oneal |
| PHONE_NUMBER | +44 785 407 9884 | 978-821-5337x023 |

DATA OBFUSCATION

TECHNICAL FIELD

The present invention relates to a computer-implemented method, computer program and computer system for obscuring sensitive data.

BACKGROUND

Figure 1A:
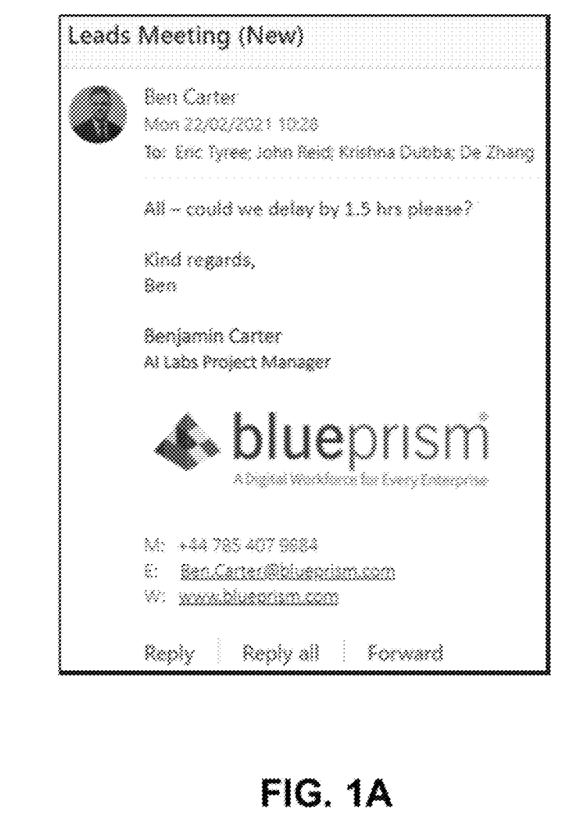
FIG. 1A depicts example image data for use in the method of the invention.

Data redaction is the process of visually removing or replacing sensitive data in a manner that does not expose the sensitive content, i.e. the cognitive content, of the data. For example, the image shown in FIG. 1A contains various types of sensitive data including a date and/or time, a domain name, an email address, a name, and a phone number. The sensitive content of this data is the specific date and/or time (Mon 22/02/2021 10:28; 1.5 hrs), the specific domain name (www.blueprism.com), the specific email address (Ben.Carter@blueprism.com), etc. Data redaction is the process of visually removing or replacing this data.

The rationale for performing data redaction is that when the redacted data is shared, the party receiving the redacted data is not able to gather any of the sensitive content. This is important because breaches of sensitive data can result in the accidental or unlawful destruction, loss, alteration, unauthorised disclosure of, or access to, sensitive data, leading to significant human consequences. Moreover, access by the receiving party to the sensitive data may be unlawful under the regulations of various jurisdictions.

Figure 1B:
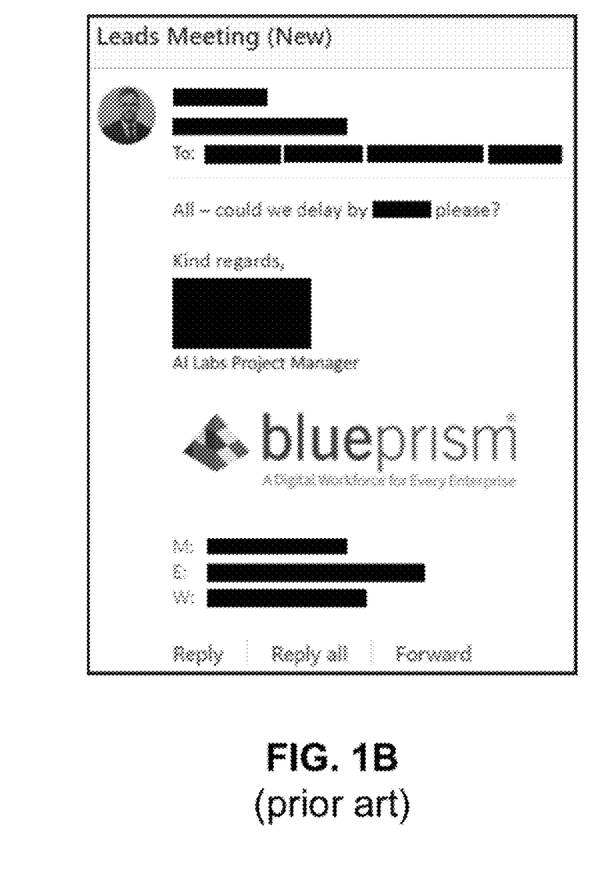
FIG. 1B (prior art) depicts the image data of FIG. 1A after applying a known data redaction technique.

There are several known techniques for data redaction. These techniques generally involve redacting sensitive data by covering or replacing detected sensitive data with, for example, an opaque (typically black) rectangle, with fixed character strings (such as '******' for passwords or 'xxxx xxxx xxxx 6789' for credit card numbers), with entity type dependent strings (such as '<PERSON>' for human names), or through pixelating. In Google Cloud, for instance, Cloud Data Loss Prevention inspects a base64-encoded image for text, detects sensitive data within the text, and then returns a base64-encoded image with any matching sensitive data obscured by an opaque rectangle. FIG. 1B shows the image of FIG. 1A this prior art technique applied.

A problem with the known data redaction techniques is that such techniques make it difficult to understand the functional format as well as the visual format of the sensitive data that has been redacted. This is particularly problematic when the sensitive data is being used by a software application, such as a robotic process automation application, and the software application needs to be developed and tested. This is because software developers are typically required to understand the functional format, and sometimes the visual format, of sensitive data to ensure that the software application is set up and functioning correctly.

SUMMARY

The present invention is defined by the independent claims, with further optional features being defined by the dependent claims.

In a first aspect of the invention, there is provided a computer-implemented method for obscuring sensitive data, the method comprising: acquiring, by a processor, image data; extracting, by the processor, structured data from the image data, the structured data being sensitive data and having a defined functional format and a defined visual format; generating, by the processor, artificial data that is different from the structured data, the artificial data having the same functional format as the structured data; generating, by the processor, artificial image data based on the image data in which the structured data is replaced with the artificial data, the artificial data being based on the visual format of the structured data; and outputting, by the processor, the artificial image data. In this way, the sensitive data can be obscured in a manner that retains the functional format of the sensitive data without revealing the sensitive cognitive content of the data. This is useful for human operators that need to understand the functional format of the sensitive data (because, for example, the functional format is interacting with another software applications such as a robotic process automation (RPA) application) but cannot have access to the sensitive data due to its sensitive content. In addition, having the visual format of the artificial data being based on the visual format of the sensitive data is useful to ensure that the artificial image data can be used in place of the image data.

In some embodiments, the artificial image data has the same visual format as the structured data. This is useful where software applications which interact with the sensitive data that need to be developed by a human operator rely in some way on the visual format of the sensitive data, for example in RPA applications.

In certain embodiments, extracting structured data from the image data comprises: performing optical character recognition on the image data to identify text in the image data; identifying structured data within the text; determining one or more bounding boxes in the image data corresponding to the structured data; and extracting one or more image portions from the image data using the one or more bounding boxes. This allows the portions of the image data that contain sensitive data to be identified for the purpose of replacing the sensitive data, and the remaining image data to be ignored, thereby reducing processing requirements for subsequent steps.

Optionally, the defined functional format comprises one or more of: entity type; and entity type format. Entity type provides information on what the sensitive data is showing, e.g. a name, date and/or time, email address, address etc. This narrows down the types of entity type formats available. Entity type format is the format of the given entity type. Determining entity type format allows the artificial data to be generated using the same entity type format as the sensitive data. For instance, if the sensitive data is a UK post code, then the artificial data will also be in UK post code format. This makes it easier to understand how other software applications handle the functional format of the sensitive data, and what impact this might have on the running of those software applications.

Optionally, the defined visual format comprises one or more of: text length; text font; text colour; and background colour. Using text length allows the artificial image data that is generated to use the same or similar length to ensure that the artificial data fits within the bounding box surrounding the sensitive data. Using text font allows potential issues with the visual format of the font to be recognised. For instance, if a software application uses optical character recognition on images, but the specific font is being used has very similar looking I (uppercase "i") and l (lowercase "L"), then such issues would be identifiable by maintaining the text font in the artificial image data. Text colour and background colour allow the artificial image data to have the same visual format as the sensitive data.

In certain embodiments, generating artificial data comprises: identifying functional format of the structured data;

tabulating the structured data extracted from the image; generating artificial data based on the functional format of the structured data; and tabulating the artificial data with the corresponding structured data. In these embodiments, the method may optionally comprise outputting the tabulated structured data and tabulated artificial data as an editable table. This allows a human operator to verify and approve the artificial data. More importantly, the human operator is able to modify the editable table, so as to make corrections to the sensitive data that has been identified. Specifically, the user could add any missed sensitive data by adding a row to the table, remove a wrongly identified sensitive data entity by deleting a row in the table, correct the errors of sensitive data by editing its corresponding cell of the table or just replace the generated artificial data. In these embodiments, the method may further optionally comprise sending a prompt to the operator to confirm the artificial data before generating the artificial image data. This improves the robustness of the approach because the human operator is able to transparently see how the mapping from sensitive data to artificial data is performed.

In further embodiments, the method may comprise acquiring second image data, extracting second structured data from the second image data, and generating second artificial data that is different from the second structured data, wherein second artificial data is the same as artificial data when the second structured data is the same as the structured data. This means that multiple occurrences of the same sensitive data are always obfuscated in the same way using the method. By making the artificial data consistent across different image data in this way, creating confusion for human operators that use the artificial data is avoided. In addition, the integrity of the data is maintained, which enables testing/debugging of software applications which use the sensitive data.

In certain embodiments, generating the artificial image data comprises: Identifying the visual format of the structured data in the one or more image portions; generating one or more artificial image portions corresponding to the one or more image portions based on the visual format of the structured data in the one or more image portions, modifying the image data to replace the one or more image portions with the one or more artificial image portions. By considering the image portions in this way, different visual formats at different image portions can be taken into consideration for obscuring the sensitive data.

In some embodiments, the artificial image data is output to a display during a software development process for software that uses the sensitive data. Both functional format of the data as well as visual format of the data can be important for various software applications that use these aspects of the data in some way. Maintaining the functional format and visual format allows a software developer to ensure that said software applications are set up and functioning correctly. Optionally, the display belongs to a different computer to the processor. Generally the party that is performing the software development is not permitted to see the sensitive data. This ensures that one party (i.e. the one permitted to see the sensitive data, the client computer) performs the obscuration of that data and the generation of artificial image data, whilst another party uses that artificial image data (the developer computer).

In certain embodiments, the software is a robotic process automation (RPA) process. RPA involves extracting structured data, typically sensitive data, from image data such as graphical user interfaces (GUIs) or documents using automated processes and workflows. Maintaining the functional format of the sensitive data in the artificial data is important to be able to determine if automated processes and workflows are functioning correctly. Maintaining the visual format of the sensitive data is also important because RPA often relies on the GUI of a software application for extracting the sensitive data. Maintaining the visual format of the sensitive data can therefore reveal potential problems with the extraction.

In a second aspect of the invention, there is provided a computer-implemented method of preventing sensitive data received via a remote access application from being output to a human operator. The method comprises receiving, from a server via a remote access application, a GUI of a software application executing on the remote server; modifying the GUI to remove sensitive data according to the method of the first aspect of the invention; and outputting the modified GUI to one or more output peripherals of a computer for receipt by the human operator. This enables the advantages of the first aspect of the invention to be used in the context of a remote access application, which is particularly useful for software development purposes.

In a third aspect of the invention, there is provided a computer program comprising instructions which, when the program is executed by a processor, cause the processor to carry out the method of the first aspect of the invention.

In a fourth aspect of the invention, there is provided a computer-readable medium comprising instructions which, when executed by a processor, cause the processor to carry out the method of the first aspect of the invention.

In a fifth aspect of the invention, there is provided a processor configured to perform the method of the first aspect of the invention.

In a sixth aspect of the invention, there is provided a computing system comprising a processor configured to perform the method of the first aspect of the invention.

BRIEF DESCRIPTION OF THE DRAWINGS

Embodiments of the invention are described below, by way of example, with reference to the following drawings, in which:

FIG. 6C depicts artificial image data in which the structured data form FIG. 1A is replaced, in accordance with the method of the invention.

DETAILED DESCRIPTION

FIG. 1 shows a computing system 10 in which, according to one embodiment, the method of the invention is implemented. Computing system 10 comprises one or more client computers 20 which are physically accessible by one or more human operators 25.

Computing system 10 also comprises one or more servers 50. Server 50 is typically a remote server, that it is say that the server is located at a different location to client computer 20 such that remote server cannot be physically accessed by human operator 25. In some instances, this may be because remote server 50 is a virtual server. In FIG. 1, servers 50-1, 50-2 and 50-3 are virtual servers in a cloud computing environment 60. Client computer 20 and server 50 are communicatively coupled to one another via at least one communication network 30. This communicative coupling enables data to be communicated between the client computer 20 and server 50. The at least one communication network 30 typically comprises the Internet (i.e., IP, IPv4, IPv6). Other communication networks such as a cellular network (i.e., 3G, 4G LTE, 5G), a local area network, a cloud network, a wireless network, or any other known communication network, may be present in addition to or as an alternative to the Internet.

Also present in computing system 10 is a developer computer 40 which is accessible by a human operator 45, who is a software developer. Developer computer 40 is communicatively coupled to the server 50, such that human operator 45 can setup, develop, configure, schedule or monitor software applications 50A running on server 50. Alternatively or additionally, developer computer 40 is communicatively coupled to client computer 20 such that the human operator 45 can setup, develop, configure, schedule or monitor software application 20A running on client computer 20.

The described computing system 10 is only exemplary and modifications to it, including removing or adding of system components, are possible.

Figure 2:
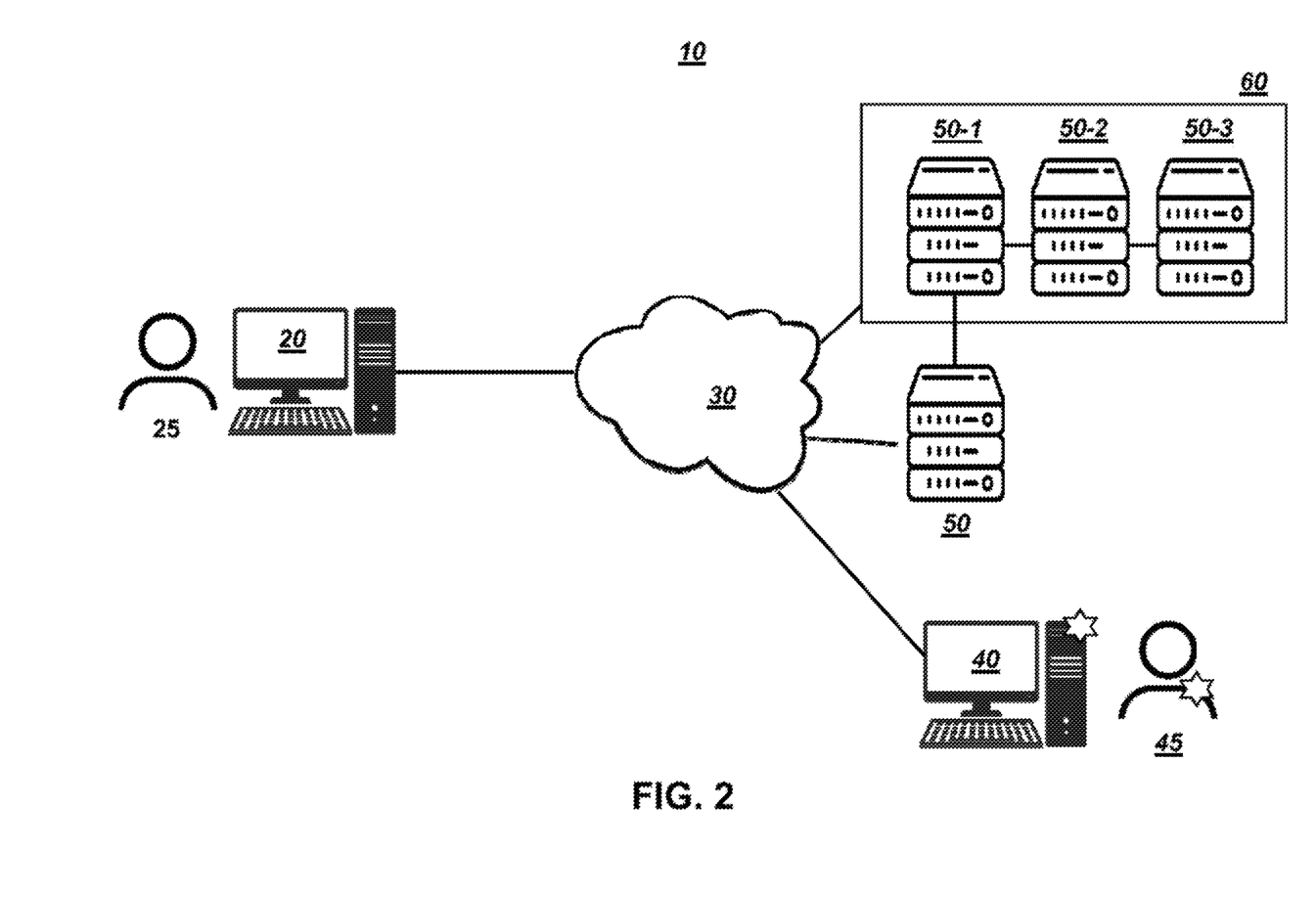
FIG. 2 depicts an example system for implementing the method of the invention.
Figure 3:
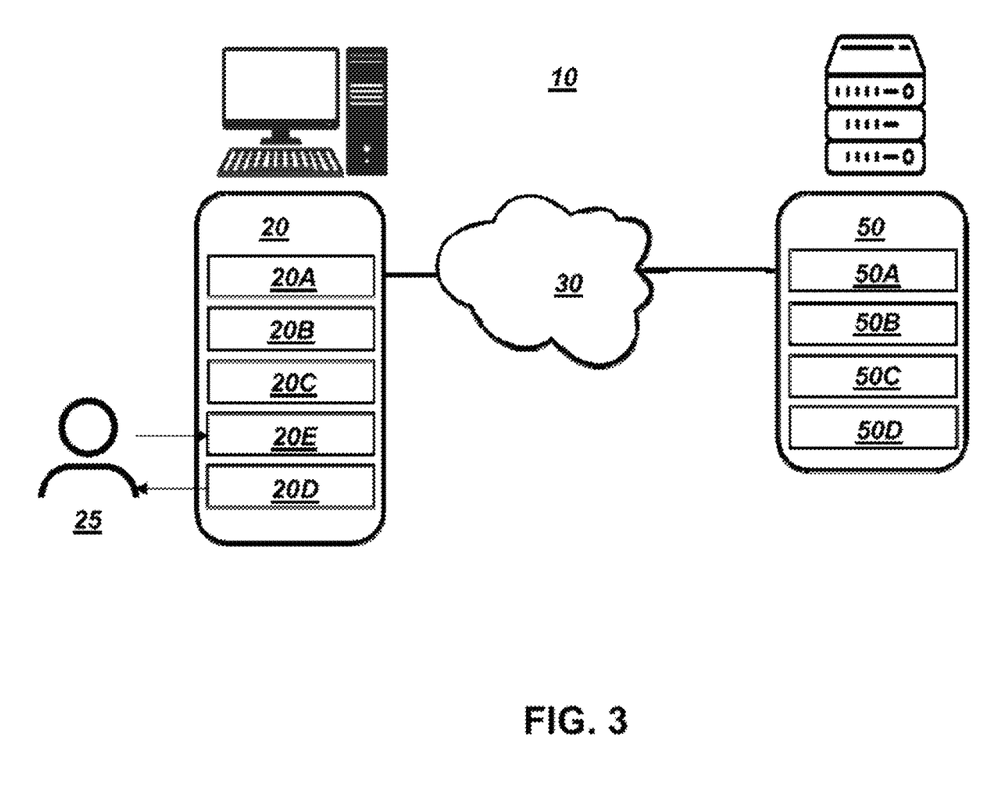
FIG. 3 depicts an example system for implementing the method of the invention.

FIG. 2 shows selected aspects of computing system 10 shown in FIG. 1. Specifically, FIG. 2 shows client computer 20 in communication with server 50 over communication network 30. Client computer 20 comprises one or more software applications 20A, processor 20B, memory 20C, one or more input peripherals 20D and one or more output peripherals 20E. Processor 20B includes a central processing unit (CPU) and/or a graphical processing unit (GPU). Memory 20C comprises a data storage device and/or semiconductor memory. The data storage devices takes the form of a hard disks drive, solid state drive, external drive, removable optical disk, and/or memory card. Semiconductor memory takes the form of volatile memory for temporarily storing data, e.g. random-access memory (RAM), and non-volatile memory for storing data long-term, e.g. read-only memory (ROM), Flash memory.

One or more software applications 20A are stored as computer programs in memory 20C and are executed on client computer 20 via processor 20B. These software applications, which facilitate direct interaction with human operator 25 via input peripherals 20D and output peripherals 20E, include the operating system (OS) and desktop applications. Examples of known operating systems include Microsoft Windows, MacOS, and Linux. Examples of known desktop applications for client computer 20 include web browsers such as Google Chrome, documentation applications such as Microsoft Word, and remote access applications, such as the remote desktop protocol (RDP) by Microsoft and the remote framebuffer (RFB) protocol. It should be appreciated, however, that the invention is not limited for use in conjunction with the specific applications mentioned here.

As mentioned, client computer 20 comprises one or more input peripherals 20D. The purpose of input peripheral 20D is to enable human operator 25 to send instructions to client computer 20. Examples of input peripheral 20D include a mouse, a keyboard, a touch screen, an image scanner, a barcode reader, a game controller, a microphone, a digital camera, a webcam, and the like.

Client computer 20 also comprises one or more output peripherals 20E. The purpose of output peripheral 20E is to enable human operator 25 to receive information from client computer 20. Examples of output peripheral 20E include a display device (for example, a computer monitor or a projector), a printer, headphones, and computer speakers. Similar to input peripheral 20D, output peripheral 20E may be integrated with client computer 20 or may be external to client computer 20. Human operator 25 receives information from client computer 20 using output peripheral 20E by interpreting the UI of application 21 using their senses, such as sight or hearing.

Other components (not shown in FIG. 2) are present in client computer 20. For example, computer 20 comprises one or more of: a network adaptor card to enable communication across the communication network 30, a power supply, a motherboard, a sound card, and the like.

Developer computer 40 has the same components as shown in FIG. 2 for client computer 20. The difference between developer computer 40 and client computer 20 is that developer computer 40 has access rights at server 50 to be able to setup, develop, configure, schedule and monitor one or more software applications 50A running on server 50, and client computer 20 does not. Additionally or alternatively, developer computer has access rights at client computer 20 to be able to setup, develop, configure, schedule and monitor one or more software applications 20A running on client computer 20, whilst client computer 20 does not have the equivalent functionality for developer computer 40. Accordingly, developer computer 40 may have additional software applications 20A to enable the human operator 45 to perform this setup, development, configuration, scheduling and monitoring. For example, remote access applications, such as the remote desktop protocol (RDP) by Microsoft and the remote framebuffer (RFB) protocol, can be used for this purpose.

As shown in FIG. 2, in addition to one or more software applications 50A, server 50 comprises a processor 50B, memory 50C and machine interface 50D. The one or more applications 50A are stored as computer programs in memory 50C and are executed on remote server 50 via processor 50B.

Server 50 can take the form of a single server (e.g., server 50 as shown in FIG. 1) or multiple servers (e.g. servers 50-1, 50-2, 50-3 shown in FIG. 1), or alternatively can take the form of a distributed server. Distributed servers operate by distributing processing and data across the constitute components. Server 50 can be a physical server or a virtual server. When server 50 is a virtual server, the software applications 50A, processor 50B, memory 50C and machine interface 50D are all virtual entities hosted in a cloud computing environment 60 of computer system 10.

The one or more software applications 50A on server 50 may not necessarily have direct interaction with human operator 25 or human operator 45 via input peripherals 20D and output peripherals 20E. Instead, the one or more software applications 50A may be applications which interact directly with client computer 20 or developer computer 40 via communication network 30 and machine interface 50D. In some instances, software application 50A on server 50 can provide a developer interface for developer computer 40, optionally via software application 20A on the developer computer 40, to assist the human operator 45 in performing setup, development, configuration, scheduling and monitoring of the software application 50A. The same developer interface is not provided to the human operator 25 of the client computer 20.

The one or more software applications 50A may use data from or associated with the client computer 20. This data may be "sensitive data", as discussed further herein. Example software application 50A which uses data from or associated with client computer 20 are robotic process automation (RPA) applications such as those described in U.S. patent application Ser. No. 14/053,319 and U.S. Pat. No. 10,469,572. In RPA applications, the data from or associated with client computer 20 is used to perform automated processes.

In one particular embodiment, when computer system 10 is used to implement an RPA application, there may be a physical server 50 in addition to a plurality of virtual servers 50-1, 50-2, 50-3 in cloud computing environment 60, as shown in FIG. 1. In this embodiment, physical server 50 is a database server which is a centralised repository that holds process definitions, logs, audit and user information. The database server communicates with a first virtual server 50-1 of the plurality of virtual servers. The first virtual server 50-1 is an application server which controls the connectivity between the database server and the second and third virtual servers 50-2, 50-3. The application server may be provisioned as a virtual Windows server and include functions such as secure credential management, database connection marshalling, data encryption, and scheduled process execution. The second virtual server 50-2 hosts virtualised instances of a typically standard, end-user desktop responsible for running automated processes for robotic process automation. The third virtual server 50-3 is an end-user desktop build that facilitates setup, development, configuration, scheduling and monitoring of the automated processes. The third virtual server 50-3 is accessible to the developer computer 40 via a dedicated software application 20A.

Sensitive Data

Oftentimes, computer systems, such as the example computer system 10 shown in FIG. 1, are required to interact with sensitive data. For instance, developer computer 40 may need to access software application 50A (e.g. an RPA application) running on server 50 in order to setup, develop, configure, schedule or monitor software application 50A. However, the software application 50A may be using data from or associated with client computer 20 which is sensitive data and therefore should not be observed by the human operator 45 on developer computer 40. In another example, developer computer 40 may need to access client computer 20 to setup, develop, configure, schedule or monitor software application 20A on client computer 20 which uses sensitive data.

Sensitive data, as referred to herein, are a special type of data which requires heightened security considerations due to its cognitive content. Breaches of sensitive data can result in the accidental or unlawful destruction, loss, alternation, unauthorised disclosure of, or access to, sensitive data, which can have significant human consequences. For example, the permanent deletion of medical records of a person potentially has significant and long-lasting consequences for the health of said person. For this reason, in various jurisdictions, the storage and processing of sensitive data is regulated, for example via General Data Protection Regulation (GDPR) in the European Union, and the Data Protection Act 2018 in the United Kingdom.

Sensitive data takes the form of text. Sensitive data may include personal information, i.e. information relating to an identified or identifiable natural person. For example, sensitive data may include a name, an address, a date of birth, a telephone number, etc. Other types of sensitive data include location data of a person, an online identifier or one or more factors specific to the physical, physiological, genetic, mental, economic, cultural or social identity of the person. Additionally or alternatively, sensitive data may include financial information, such as credit card numbers, and bank numbers. As a further alternative, sensitive data may include medical information.

Sensitive data for the purpose of the invention takes the form of structured data. The phrase "structured data" as used herein means data that can be stored within an electronic file such as a relational database that is structured in rows (records) and columns (fields). For example, to retrieve a date, the date field (date column) is accessed. In contrast, to derive meaning from "unstructured" free-form text, the text must be sequentially scanned and compared.

The sensitive data has a defined functional format as well as a defined visual format. The phrase "functional format", as used herein, is a reference to the part of the sensitive data which has a technical function in a technical system such as controlling the operation of client computer 20 through a software application 20A, and in particular the format of that part. The phase "visual format", as used herein, is a reference to the manner of presentation of the sensitive data.

Functional format may comprise one or more of entity type and/or entity type format. Entity type provides information on what the sensitive data is showing, e.g. a name, date and/or time, email address, address etc. This narrows down the types of entity type formats available because possible functional formats for an email address are different from those of a telephone number. Entity type format is the format of the given entity type. Date and/or time entity types have many different possible entity type formats. For instance, a date can be represented in the following ways "DD/MM/YYY" (European standard format), "MM/DD/YYYY" (US standard format) and "YYYY/MM/DD" (Japanese standard format), where "D" represents the day number, "M" is the month number and "Y" is the year number. Time can be represented "hh:mm", "hh:mm:ss", where "h" is hour number in a 24 hour clock, "m" is the number of minutes and "s" is the number of seconds. Other time formats such as 12 hour clocks (AM, PM) and different time zones (GMT, EST, etc.). In another example, for a UK postal code, entity type format has to be one of a set number of formats: "A9AA 9AA", "A9A 9AA", "A9 9AA", "A99 9AA", "AA9 9AA", or "AA99 9AA" (where "A" signifies a letter and "9" signifies a digit).

Visual format may comprise one or more of text length, text font, text colour, and/or background colour. Text length represents the horizontal span of the text. Text length can either be measured based on the number of characters in the text (e.g. "Ben Carter" is 10 characters, including the space) or using a pixel count. Text font includes the typeface of the text (e.g. Arial, Times New Roman, Courier New), the size of the text (e.g. 12 pts), and any special style characteristic (Bold, Italic, Underlined, Strikethrough, Subscript, Superscript, etc.). Text colour is the main colour of the text, typically measured on an RGB scale or HSL scale. Background colour is the main colour of the background surrounding the text, again typically measured on an RGB scale or HSL scale.

Figure 4:
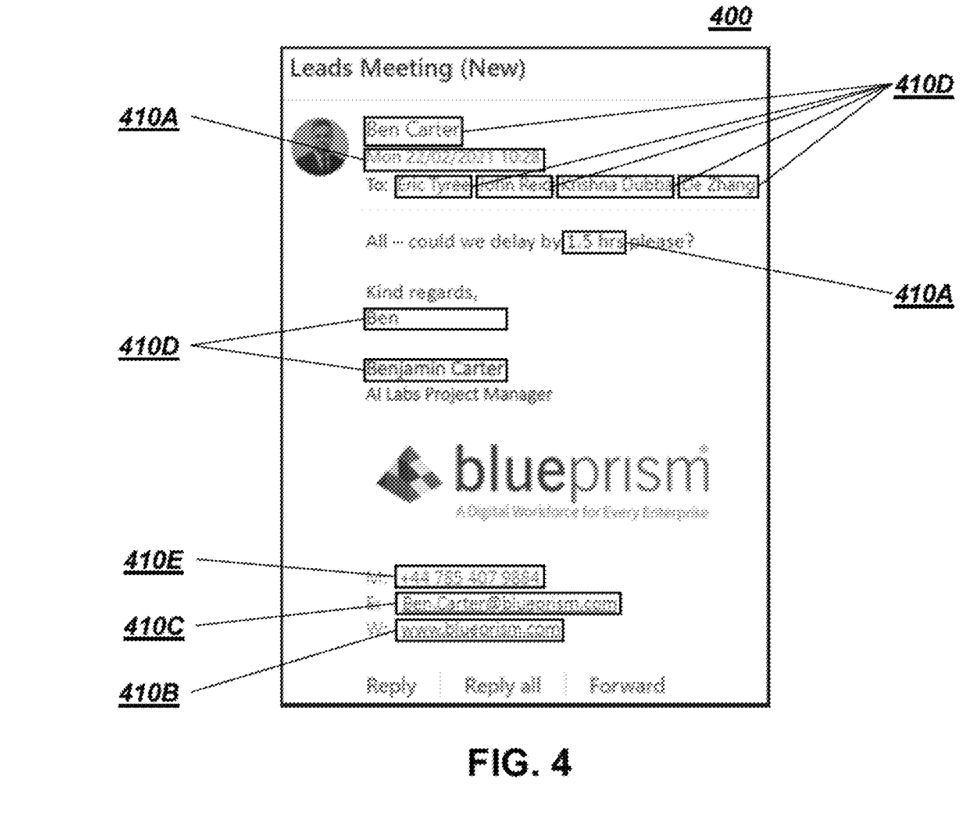
FIG. 4 depicts example image data showing sensitive data for obscuring according to the method of the invention.

FIG. 4 is an example graphical user interface (GUI) 400 which contains sensitive data 410. In this example, sensitive data 410 has the follow entity types: a date and/or time 410A, a domain name 410B, an email address 410C, a name 410D, and a phone number 410E. There are two entity type formats shown for the date and/or time 410A, which are "ddd DD/MM/YYYY hh:mm" and decimalised hours. For visual format, the sensitive data has the same font (Calibri), with grey text colour and white background colour. This example is discussed in further detail below in context of the method of the invention and with respect to FIG. 6. This GUI is typical of the kind seen in RPA applications.

Various techniques for redacting sensitive data such as the type shown in FIG. 4 are known. However, such techniques are not suitable for use in the scenario when the sensitive data from or associated with client computer 20 is being used by software application 50A, and the software application 50A needs to be further developed and tested by human operator 45 on developer computer 40. This is because known techniques replace or remove the functional format as well as the visual format of the sensitive data, which makes it difficult for human operator 45 to perform software development and testing tasks since the functional format and visual format of the data is not made available.

Overview of Method

Figure 5:
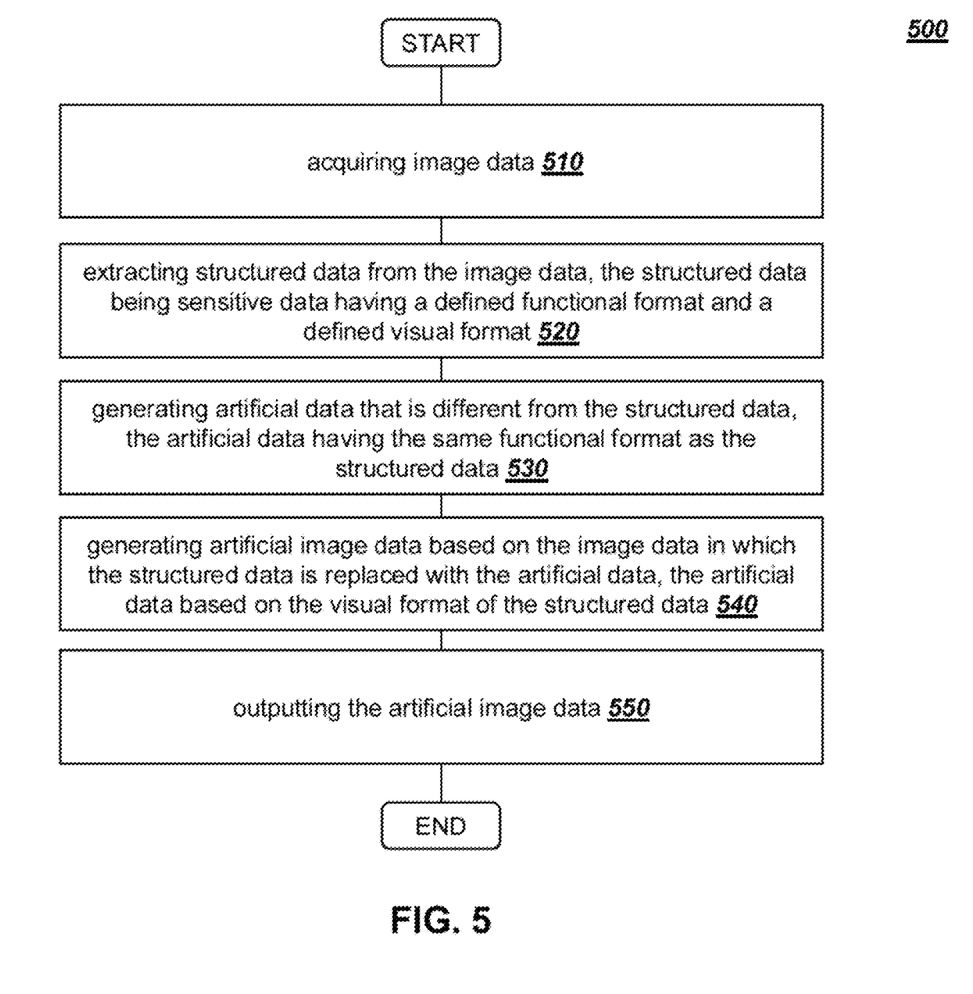
FIG. 5 depicts the method of the invention.

FIG. 5 shows a method 500 employed by the invention to obscure sensitive data which does not have the same disadvantages as known data redaction techniques. The method 500 of FIG. 4 may be performed by processor 20B of client computer 20 or by processor 50B of server 50. The method of FIG. 4 should not be performed by processor 20B of developer computer 40 since the developer computer 40 should not have access to the image data as this contains the sensitive data.

As shown in FIG. 5, the method 500 comprises the following steps performed by the processor:
  acquiring, by a processor, image data (step 510);
  extracting, by the processor, structured data from the image data, the structured data being sensitive data and having a defined functional format and a defined visual format (step 520);
  generating, by the processor, artificial data that is different from the structured data, the artificial data having the same functional format as the structured data (step 530);
  generating, by the processor, artificial image data based on the image data in which the structured data is replaced with the artificial data, the artificial data being based on the visual format as the structured data (step 540); and
  outputting, by the processor, the artificial image data (step 550).

The method 500 allows the sensitive data to be obscured in a manner that retains the functional format of the sensitive data, as well as a similar visual format, without revealing the sensitive cognitive content of the data. This is particularly useful for human operator 45 of developer computer 40 in order to perform software development and testing tasks on a software application 50A at server 50 which uses sensitive data associated with or from client computer 20, or software development and testing tasks for a software application 20A on client computer 20 which uses sensitive data associated with or from client computer 20.

Steps 510 to 550 are discussed in further detail in the sections below.

Image Data Acquisition

At step 510 of FIG. 5, processor 20B or processor 50B acquires image data. The image data is associated to or from client computer 20. By "associated with" it is meant that the image data belongs or relates to the client of client computer 20. By "from" it is meant both image data that is received indirectly from the client computer 20 and/or directly from the client computer 20.

The image data may contain data which is sensitive data from the perspective of client computer 20. This means that human operator 25 on client computer 20 is authorised to observe and interact with the sensitive data, but human operator 45 on developer computer 40 is not.

The image data may take the form of a graphical user interface (GUI). For instance, the image data may be a GUI image captured from client computer 20 or server 50 (in embodiments where server 50 has GUI that is accessible by a human operator). The GUI may show one or more of the software applications 20A running on client computer 20 or software applications 50A running on server 50. The GUI may include the entire desktop interface (as would be output to human operator) or may include only the portion of the desktop interface relating to a particular one of the software applications 20A or 50A. When the image data takes the form of a GUI, the processor 20B or processor 50B acquires the image data by capturing the GUI. Alternatively, the GUI may have previously been captured by the processor 20B or processor 50B and stored in memory 20C or memory 50C, respectively. In such instances, the GUI can be retrieved from memory 20C, or memory 50C. In some instances, the GUI may be captured by a remote access application.

Alternatively, the image data may take the form of a document, such as a pdf or image file. In this case, the processor 20B or processor 50B acquires the image data from memory 20C or memory 50C, respectively, where the image data is stored.

Figure 6A:
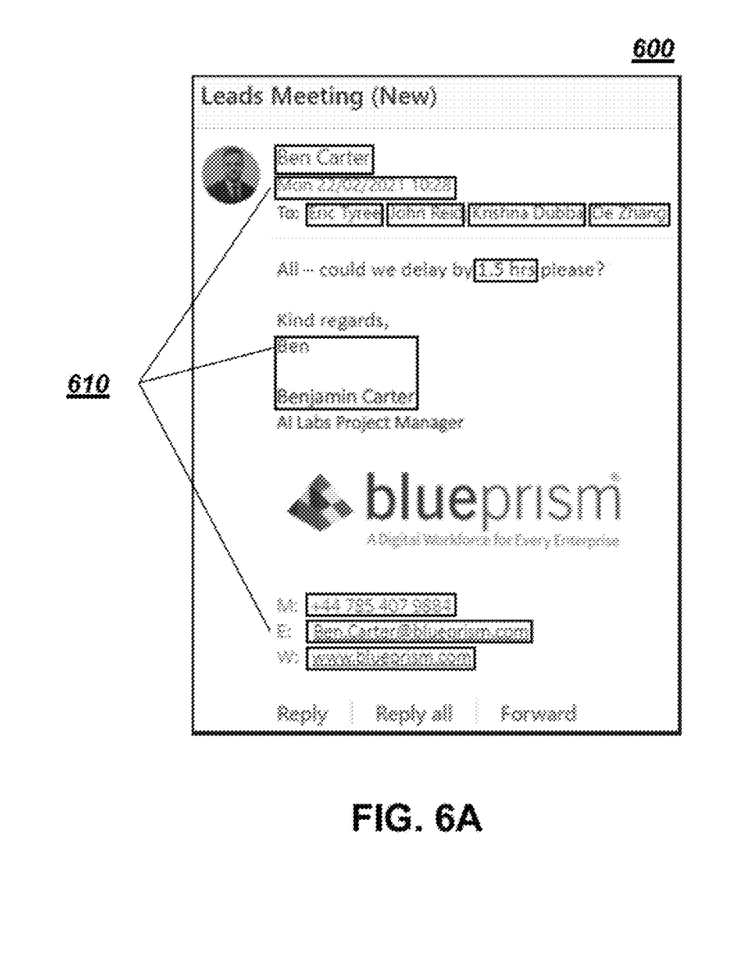
FIG. 6A depicts extraction of structured data from the example image data of FIG. 1A according to the method of the invention.

FIG. 6A gives an example of image data. In particular, FIG. 6A shows a GUI 600 of an email application, such as Microsoft Outlook. This GUI contains sensitive data such as names, dates, a phone number, email addresses, and a domain name.

Structured Data Extraction

At step 520 of FIG. 5, processor 20B or processor 50B (whichever acquired the image data in step 510) extracts structured data from the image data. As mentioned above, the structured data is sensitive data having a defined functional format and a defined visual format. Thus, the aim of this step is to identify and extract any structured data within the image data that is sensitive data.

Image data is inherently unstructured, however there are known methods for identifying structured data from unstructured image data. For example, Google uses Document AI, which uses computer vision (including optical character recognition (OCR)) and natural language processing (NLP) to create pre-trained models for documents.

One method for performing step 520 is by first performing optical character recognition on the image data to identify text in the image data and identifying structured data within the text. This can be performed using a known method such as Document AI. After the structured data has been identified within the text, performing step 520 may involve determining one or more bounding boxes in the image data corresponding to the structured data and extracting one or more image portions from the image data using the one or more bounding boxes. Preferably, only structured data which has been identified as being sensitive data needs to have the corresponding image portion extracted from the image data.

In addition to the one or more image portions from the image data which each contain structured data corresponding to sensitive data, which are extracted using the method explained above, step 520 has a second output. That is, the underlying structured data which corresponds to the sensitive data in the one or more image portions is also output. This data is tabulated (put in a table) in preparation for step 530.

The example image data, GUI 600, in FIG. 6A, shows a plurality of bounding boxes 610 containing structured data. The plurality of bounding boxes 610 are extracted to form a plurality of image portions containing sensitive data. In addition, the structured data within the image portions is extracted. For GUI 600, the structured data includes "1.5 hrs", "Mon 22/02/2021 10:28", "www.blueprism.com", "ben.carter@blueprism.com", "Ben Benjamin Carter", "Ben Carter", "De Zhang", "Eric Tyree", "John Reid", "Krishna Dubba", and "+44 785 407 9884". This structured data can be tabulated, as shown in column 615 of table 620 on FIG. 6B.

Artificial Data Generation

In step 530 of FIG. 5, processor 20B or processor 50B (whichever acquired the image data in step 510) generates artificial data that is different from the structured data but which has the same functional format as the structured data. The purpose of this step is to provide replacement data for the structured data which does not include the sensitive content, but which retains the functional format.

In order to be able to generate artificial data that is different from the structured data, but which has the same functional format as the structured data, it is necessary to be able to identify the functional format of the data. This is achieved by making use of machine learning models and/or heuristic rules. The machine learning models are pre-trained using machine learning techniques such as neural networks. In particular, neural network models for the recognition of entity types in text may be based on transformer architectures such as RoBERTa. For example, the base version of the pre-trained RoBERTa model ("roberta-base") provided by Hugging Face (see https://huggingface.co/roberta-base) consists of 12 encoder layers with 768 hidden vector size, 12 attention heads, and 125M parameters. This model was trained on 160+GB of English-language text data from 5 publicly available corpora of varying sizes and domains using the enhanced BERT (Bidirectional Encoder Representations from Transformers) algorithm. For the purpose of entity recognition, the pretrained roberta-base model may be fine-tuned on labelled NER (Named Entity Recognition) datasets such as the OntoNotes 5 dataset (see e.g. https://deepai.org/dataset/ontonotes-v5-english) containing 18 commonly seen entity types. The heuristic rules may include (weighted) regular-expression textual patterns and optionally contextual clues such as the surrounding words. For example, the regular expression "\b([0-9]{10})\b" can be used to extract from the text 10-digit sequences which may represent a US phone number or a US bank account number. Then, if in the local context (e.g., 5 words before and 5 words after the 10-digit sequence) there are words such as "mobile" or "call", there is a high probability that the 10-digit sequence is a US phone number. Conversely, if in the local context there are words like "savings" or "debit", there is a high probability that the 10-digit sequence is a US bank account number. Furthermore, regular expressions may be used to determine the functional format of the data. For example, using the regular expression "(\+[0-9]{1,3})? ([0-9]{10})\b", it can be determined whether a 10-digit phone number is preceded by the corresponding country calling code (in the format of a plus sign followed by 1-3 digits and then a space character) or not.

An indication of the entity type and the entity type format may be output or stored in memory 20B or memory 50B. For example, in FIG. 6A one of the bounding boxes contains the structured data "Mon 22/02/2021 10:28". Using the method described above, the entity type of this structured data is deemed to be a "date and/or time", whilst the entity type format is deemed to be "ddd DD/MM/YYYY hh:mm".

Figure 6B:
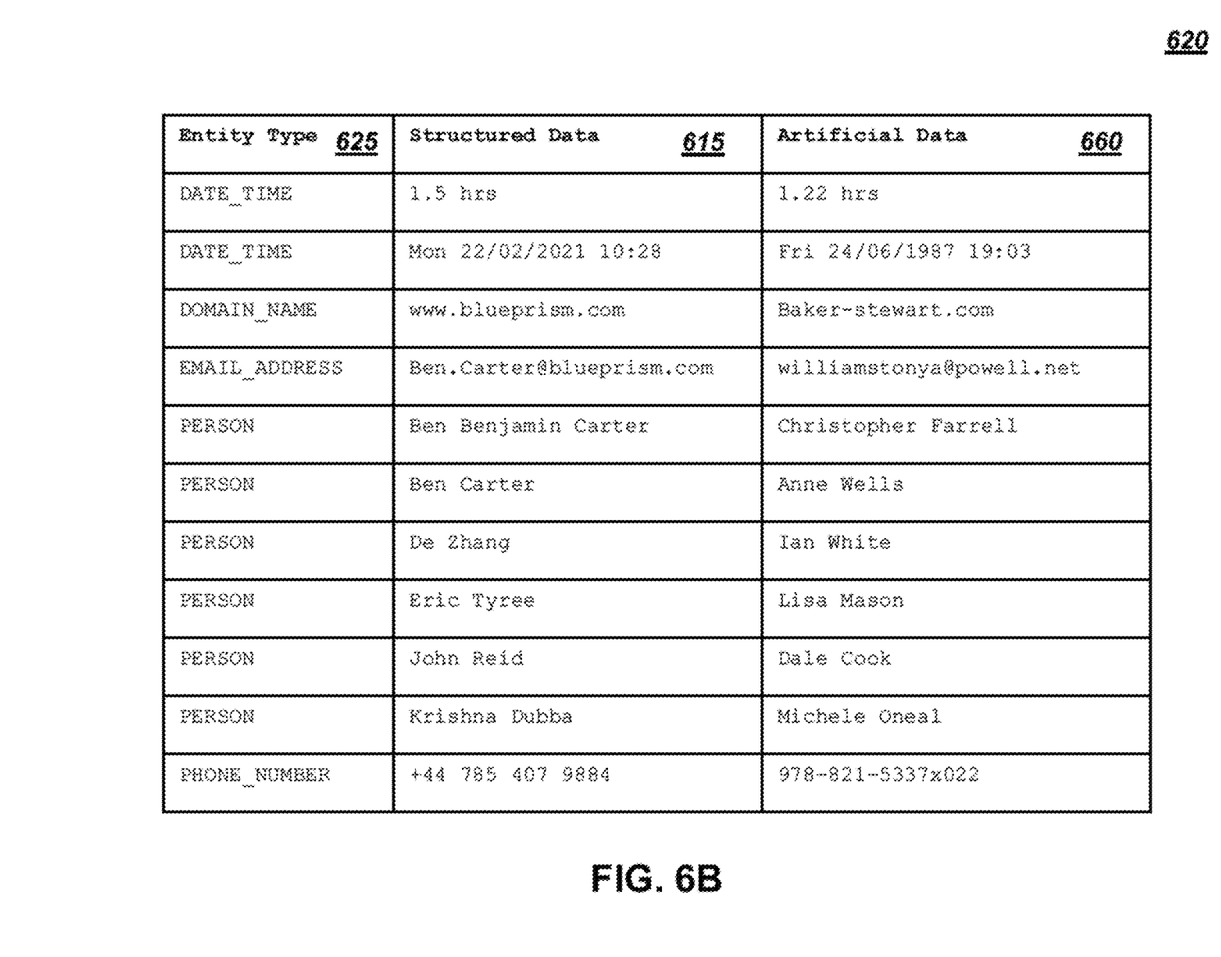
FIG. 6B depicts a database corresponding to the structured data in FIG. 1A for use in the method of the invention.
Figure 6C:
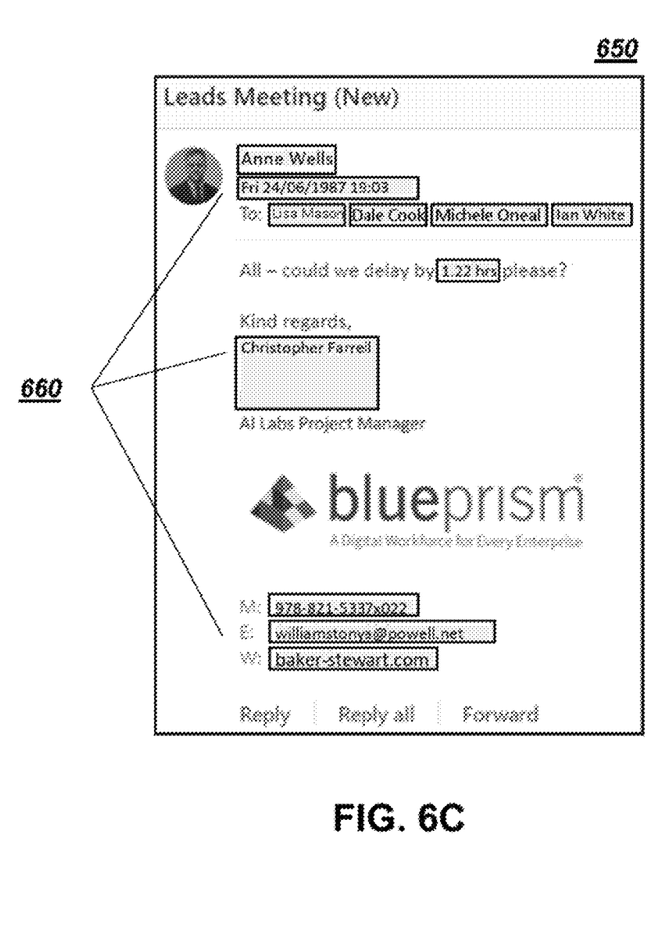

Then, in order to generate the artificial data, it is preferred to use a table which can be made editable to human operator 25. In particular, after identifying the functional format of the structured data, the structured data extracted from the image is tabulated. This tabulation may be performed with aid of the identified functional format. Additionally, the functional format itself can also be tabulated. An example of this is shown in FIG. 6B where table 620 has a first column 625 using the identified functional format entity type, and a second column 615 with the corresponding structured data. In this example, the entity type is arranged alphabetically so that entity types are grouped together.

Subsequently, for each row in the table, artificial data is generated which has the same functional format as the structured data, but which has different cognitive content, and is therefore not sensitive data. For example, for the structured data "Mon 22/02/2021 10:28", which is a date and/or time entity type, this can be changed to an artificial date and/or time of the same functional format, e.g. "Fri 24/06/1987 19:03". The artificial data is then tabulated along with the structured data and optionally the functional format. FIG. 6B shows a third column 660 in table 620 which includes the generated artificial data.

Generating artificial data which has the same functional format as the structured data is performed by random sampling from a probability distribution of entities conditioned on the entity type and the entity type format. For example, to generate an artificial person name, a first-name from a list of possible first-names is randomly sampled and a surname from a list of surnames is randomly sampled. The first-name and the surname are then put together in the same format of the structured data (e.g., "SURNAME, First-name"). For another example, to generate an artificial date, a date from the calendar that is within 5-year distance from the original date is randomly sampled, and the date's text representation is then produced using the same format of the structured data (e.g., "ddd DD/MM/YYYY"). Optionally, post-filtering may be carried out to ensure that the generated artificial data is in the valid range required by the corresponding software application.

The tabulated structured data and tabulated artificial data may be output on client computer 20 as an editable table so that human operator 25 can edit. This allows the human operator to add, delete, or edit the structured data to artificial data mappings as they see appropriate. For example, human operator 25 may edit the editable table so as to make corrections to the structured data detection in the image data. Specifically, the user may add any missed sensitive data entity by adding a row to the table, remove a wrongly detected sensitive data by deleting its row in the table, correct the errors of sensitive data detection by editing its corresponding cell of the table (e.g., change the incorrectly identified 'Ben Benjamin Carter' to 'Benjamin Carter' in FIG. 6B), or just replace the automatically generated fake data entity to whatever the user prefers (e.g., change the fake name for Krishna Dubba from 'Michele Oneal' to 'Dr Strangelove' in FIG. 6B).

It is useful to have human operator 25 approve the artificial data before generating the artificial image data in step 540. Accordingly, processor 20B may send human operator 25 a prompt to confirm the artificial data.

The editable table can include structured data and artificial data from different (e.g. second, third, etc.) image data. In such instances, it is preferable that the artificial data generated based on the subsequent image data (e.g. the second artificial data) is the same as artificial data in instances where the subsequent structured data (e.g. the second structured data) is the same as the structured data. For example, referring to the GUI 600 in FIG. 6A, if the second image data related to a further GUI which contained an email from Ben Carter, then the structured data "Ben Carter" would appear in both the original image data and the subsequent, second image data. Then, regardless of whether the structured data "Ben Carter" came from the original image data or the second image data, the generated artificial data would be Anne Wells (see FIG. 6B). The editable table does not need to generate a new row for the instance of "Ben Carter" in the second image data, but can use the row already generated from the original image data. In this way, the editable table is considered to be a global table of mappings between structured data and artificial data over one or more image data.

Artificial Image Data Generation

At step 540 of FIG. 5, the processor 20B or processor 50B generates artificial image data based on the image data in which the structured data is replaced with the artificial data, the artificial data being based on the visual format as the structured data.

To perform step 540, processor 20B or processor 50B first identifies the visual format of the structured data in the one or more image portions, then generates one or more artificial image portions corresponding to the one or more image portions based on the visual format of the structured data in the one or more image portions, and then modifies the image data to replace the one or more image portions with the one or more artificial image portions.

Identifying visual format is performed by utilising digital image processing techniques such as those implemented in the Python Image Library (Pillow) and also computer vision techniques such as those provided by the OpenCV library. Known techniques exist for the detection of text length, text colour, and background colour. The recognition of text font may be achieved by performing grid search or Bayesian optimisation over the possible configurations of font typeface, font size, and font style to find out which configuration would produce the image of structured data most similar to the original image portion.

Generating one or more artificial image portions is performed by utilising digital image processing techniques such as those implemented in the Python Image Library (Pillow). For example, the Python Image Library (Pillow) provides the ImageDraw module that may be used to create new images and to annotate or retouch existing images. In particular, the ImageDraw.rectangle function may be used to draw a rectangle box at the specified position, in the specified size, and with the specified fill colour as the background, while the ImageDraw.text function can be used to draw a piece of given text (i.e., the generated artificial data in the original functional format) at the specified position with the specified font and colour. Here the text font, text colour and background colour are all given by the visual format identified via the above mentioned method.

In some instances, the artificial image data is made to have the same visual format as the structured data in the image data. This ensures that a human operator 45 performing software development on a software application 20A that relies on the visual format of the structured data is able to understand what the visual format is with a high degree of accuracy. Alternatively, the artificial image data can be made to have a visual format with one or more differences from the structured data in the image data so that the portions of the artificial image data pertaining to the artificial data are distinguished from the portions relating to the image data. For example, in the artificial image data of artificial GUI 650 in FIG. 6C, the artificial image portions have a highlighted background to show that these portions are artificial. In this case, the artificial data is still considered to be based on the visual format as the structured data.

Outputting Artificial Image Data

In step 550 of FIG. 5, the processor 20B or processor 50B (whichever received the image data) outputs the artificial image data.

The artificial image data may be output to a file which is stored in memory 20C or memory 50C. The file can then be accessed at a later date for the purpose of software development by human operator 45 at developer computer 40. The file may contain the artificial image data only. In such instances, the file may be in the same file format (e.g. pdf, jpeg) as the original image data. Alternatively, the file may be a comprehensive document which includes the artificial image data together with other relevant information for guiding and supporting software development. An example of such a file is the process design document (PDD) that captures the flow of a business process to be developed within robotic process automation (RPA).

Alternatively or additionally, the artificial image data may be output to a display. For example, the artificial image data may be output to client computer 20 for human operator 25 to check. In another example, the artificial image data may be output to display which belongs to a different computer from the processor 20B or processor 50B. In particular, the artificial image data may be output on a display of developer computer 40 so that human operator 45 does not see the sensitive data in the image data during a software development process for software that uses the sensitive data.

In some instances, the artificial image data may be used to develop a robotic process automation (RPA) application which uses the sensitive data. RPA involves extracting structured data, typically sensitive data, from image data such as GUIs or documents using automated processes and workflows. Maintaining the functional format of the sensitive data in the artificial data is important to be able to determine if automated processes and workflows are functioning correctly. Maintaining the visual format of the sensitive data is also important because RPA often relies on the GUI of a software application for extracting the sensitive data. Maintaining the visual format of the sensitive data can therefore reveal potential problems with the extraction.

In some instances, the artificial image data may be used in a remote access applications, such as the remote desktop protocol (RDP) by Microsoft and the remote framebuffer (RFB) protocol. For example, the method 500 of FIG. 5 and outputted artificial image data may be used in place of the GUI image modification technique used in U.S. Ser. No. 17/144,640 (Method of Remote Access). This provides a computer-implemented method of preventing sensitive data received via a remote access protocol from being output to a human operator (e.g. human operator 45). In such instances, the method comprises receiving, from server 50 via a remote access application, a GUI of a software application 50A executing on the remote server; modifying the GUI to obscure sensitive data according to a method of the invention; and outputting the modified GUI to one or more output peripherals 40E of developer 40 computer for receipt by the human operator 45.

GENERAL

When implemented in software, the invention can take the form of a computer program. The computer program may be embodied as a computer-readable medium having computer executable code for use by or in connection with a processor. A computer-readable medium is any tangible device that can contain, store, communicate, propagate, or transport the program for use by or in connection with a processor. Moreover, a computer-readable medium can be an electronic, magnetic, optical, electromagnetic, infrared, or semiconductor device or a propagation medium. Examples of a computer-readable medium include a semiconductor memory, a random access memory (RAM), a read-only memory (ROM), a Flash memory, a hard disk drive, a solid state drive, an optical disk, and memory cards. Current examples of optical disks include CDs, DVDs, and Blu-Rays. Current examples of memory cards include USB flash drives, SD cards, microSD cards, MMC cards, xD cards, and memory sticks.

When implemented in hardware, the invention is not limited to the specific hardware described herein. The skilled person would appreciate that the invention can be implemented on different hardware than that described with respect to FIG. 1 and FIG. 2 and still function in the way described.

The flow diagrams in the figures illustrate the architecture, functionality, and operation of possible implementations of the methods of the invention. In some alternative implementations, the steps noted in the figures may occur out of the order noted in the figures. For example, two steps shown in succession may, in fact, be performed substantially concurrently, or the blocks may sometimes be performed in the reverse order, depending upon the functionality involved.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A computer-implemented method for obscuring sensitive data, the method comprising:
   acquiring, by a processor, unstructured image data;
   extracting, by the processor, structured data from the unstructured image data, the structured data being sensitive data and having a defined functional format and a defined visual format;
   generating, by the processor, artificial data that is different from the structured data, the artificial data having the same functional format as the structured data;
   generating, by the processor, artificial unstructured image data based on the unstructured image data in which the structured data is replaced with the artificial data, the artificial data being based on the visual format of the structured data; and
   outputting, by the processor, the artificial unstructured image data.

2. The method of claim 1, wherein the artificial unstructured image data has the same visual format as the structured data.

3. The method of claim 1, wherein extracting structured data from the unstructured image data comprises:
   performing optical character recognition on the unstructured image data to identify text in the unstructured image data;
   identifying structured data within the text;
   determining one or more bounding boxes in the unstructured image data corresponding to the structured data; and
   extracting one or more image portions from the unstructured image data using the one or more bounding boxes.

4. The method of claim 3, wherein generating the artificial unstructured image data comprises:
   identifying the visual format of the structured data in the one or more image portions;
   generating one or more artificial image portions corresponding to the one or more image portions based on the visual format of the structured data in the one or more image portions,
   modifying the image data to replace the one or more image portions with the one or more artificial image portions.

5. The method of claim 1, wherein the defined functional format comprises one or more of:
   entity type; and
   entity type format.

6. The method of claim 1, wherein the defined visual format comprises one or more of:
   text length;
   text font;
   text colour; and
   background colour.

7. The method of claim 1, wherein generating artificial data comprises:
   identifying a functional format of the structured data;
   tabulating the structured data extracted from the unstructured image data;
   generating artificial data based on the functional format of the structured data; and
   tabulating the artificial data with the corresponding structured data.

8. The method of claim 7, further comprising outputting the tabulated structured data and tabulated artificial data as an editable table.

9. The method of claim 8, further comprising sending a prompt to the operator to confirm the artificial data before generating the artificial unstructured image data.

10. The method of claim 7, further comprising acquiring second unstructured image data, extracting second structured data from the second unstructured image data, and generating second artificial data that is different from the second structured data, wherein the second artificial data is the same as the artificial data when the second structured data is the same as the structured data.

11. The method of claim 1, wherein the artificial unstructured image data is output to a display during a software development process for software that uses the sensitive data.

12. The method of claim 11, wherein the display belongs to a different computer to the processor.

13. The method of claim 11, wherein the software is a robotic process automation (RPA) process.

14. A computer-implemented method of preventing sensitive data received via a remote access application from being output to a human operator, the method comprising:
- receiving, from a server via a remote access application, a graphical user interface of a software application executing on the remote server;
- modifying the graphical user interface to remove sensitive data according to the method of claim 1; and
- outputting the modified graphical user interface to one or more output peripherals of a computer for receipt by the human operator.

15. A computer program stored on a computer storage device comprising instructions which, when the program is executed by a processor, cause the processor to carry out the method of claim 1.

16. A computing system comprising a processor configured to perform the method of claim 1.

* * * * *